United States Patent
Sakai

(10) Patent No.: US 12,423,555 B2
(45) Date of Patent: Sep. 23, 2025

(54) STORAGE MEDIUM STORING QUANTIZATION PROGRAM, QUANTIZATION METHOD, AND QUANTIZATION APPARATUS

(71) Applicant: FUJITSU LIMITED, Kawasaki (JP)

(72) Inventor: Yasufumi Sakai, Fuchu (JP)

(73) Assignee: Fujitsu Limited, Kawasaki (JP)

( * ) Notice: Subject to any disclaimer, the term of this patent is extended or adjusted under 35 U.S.C. 154(b) by 1015 days.

(21) Appl. No.: 17/500,998

(22) Filed: Oct. 14, 2021

(65) Prior Publication Data

US 2022/0172022 A1 Jun. 2, 2022

(30) Foreign Application Priority Data

Dec. 2, 2020 (JP) .................................. 2020-200353

(51) Int. Cl.
*G06N 3/04* (2023.01)
(52) U.S. Cl.
CPC ....................... *G06N 3/04* (2013.01)
(58) Field of Classification Search
None
See application file for complete search history.

(56) References Cited

U.S. PATENT DOCUMENTS

| 11,461,614 B2 * | 10/2022 | Baum ...................... G06F 30/30 |
| 11,650,551 B2 * | 5/2023 | Jha ......................... G06N 20/00 706/12 |
| 11,861,467 B2 * | 1/2024 | Gadelrab ................. G06N 5/04 |
| 2019/0012559 A1 * | 1/2019 | Desappan ............. G06V 10/764 |
| 2019/0050710 A1 | 2/2019 | Wang et al. |
| 2019/0205736 A1 * | 7/2019 | Bleiweiss .............. G06N 5/046 |
| 2020/0012926 A1 * | 1/2020 | Murata ..................... G06N 3/04 |
| 2020/0184318 A1 * | 6/2020 | Minezawa ............. G06N 20/10 |
| 2020/0193273 A1 * | 6/2020 | Chung .................... G06F 17/16 |

(Continued)

FOREIGN PATENT DOCUMENTS

| JP | 2020-009048 A | 1/2020 |
| WO | 2020/019236 A1 | 1/2020 |
| WO | 2020/049681 A1 | 3/2020 |

OTHER PUBLICATIONS

Khoram, Soroosh et al., "Adaptive Quantization of Neural Networks", Published as a conference paper at ICLR 2018, Feb. 23, 2018, pp. 1-13, XP055545493, Retrieved from the Internet: URL: https://openreview.net/pdf?id=SyOK1Sg0W [retrieved on Jan. 21, 2019].

(Continued)

*Primary Examiner* — Maikhanh Nguyen
(74) *Attorney, Agent, or Firm* — Fujitsu Intellectual Property Center

(57) ABSTRACT

A non-transitory computer-readable storage medium storing a quantization program that causes at least one computer to execute a process, the process includes calculating, for all layers of a neural network, differences each between a trust region radius threshold and a quantization error of a first bit width that is narrower by one step than a second bit width, calculating, based on the differences, each scaling coefficient for all the layers, updating a trust region radius by using a smallest value among the scaling coefficients, and quantizing a parameter of the neural network by a third bit width set based on the trust region.

3 Claims, 12 Drawing Sheets

(56) References Cited

U.S. PATENT DOCUMENTS

| | | | |
|---|---|---|---|
| 2020/0218962 A1* | 7/2020 | Lee | G06N 3/063 |
| 2020/0334521 A1* | 10/2020 | Sakai | G06N 3/084 |
| 2020/0410360 A1* | 12/2020 | Tachibana | G06N 3/063 |
| 2021/0019630 A1* | 1/2021 | Yao | G06N 3/084 |
| 2021/0081785 A1* | 3/2021 | Sakai | G06N 3/045 |
| 2021/0192319 A1 | 6/2021 | Asai | |

OTHER PUBLICATIONS

Park, Eunhyeok et al.,"Weighted-Entropy-based Quantization for Deep Neural Networks", 2017 IEEE Conference on Computer Vision and Pattern Recognition (CVPR), IEEE Computer Society, Jul. 21, 2017, pp. 7197-7205, XP033250087.

In, Yuhan et al.,"Optimization Strategies in Quantized Neural Networks: A Review", 2019 International Conference on Data Mining Workshops (ICDMW), IEEE, Nov. 8, 2019, pp. 385-390, XP033685134.

Extended European Search Report dated Apr. 14, 2022 for corresponding European Patent Application No. 21203656.0, 9 pages.

\*\*\*Please note US-2020/0012926-A1 and JP-2020-9048-A cited herewith, were previously cited in an IDS filed on Oct. 14, 2021. \*\*\*.

\* cited by examiner

QUANTIZATION-TARGET VECTORS: $W_1$, $W_2$

FIG. 7
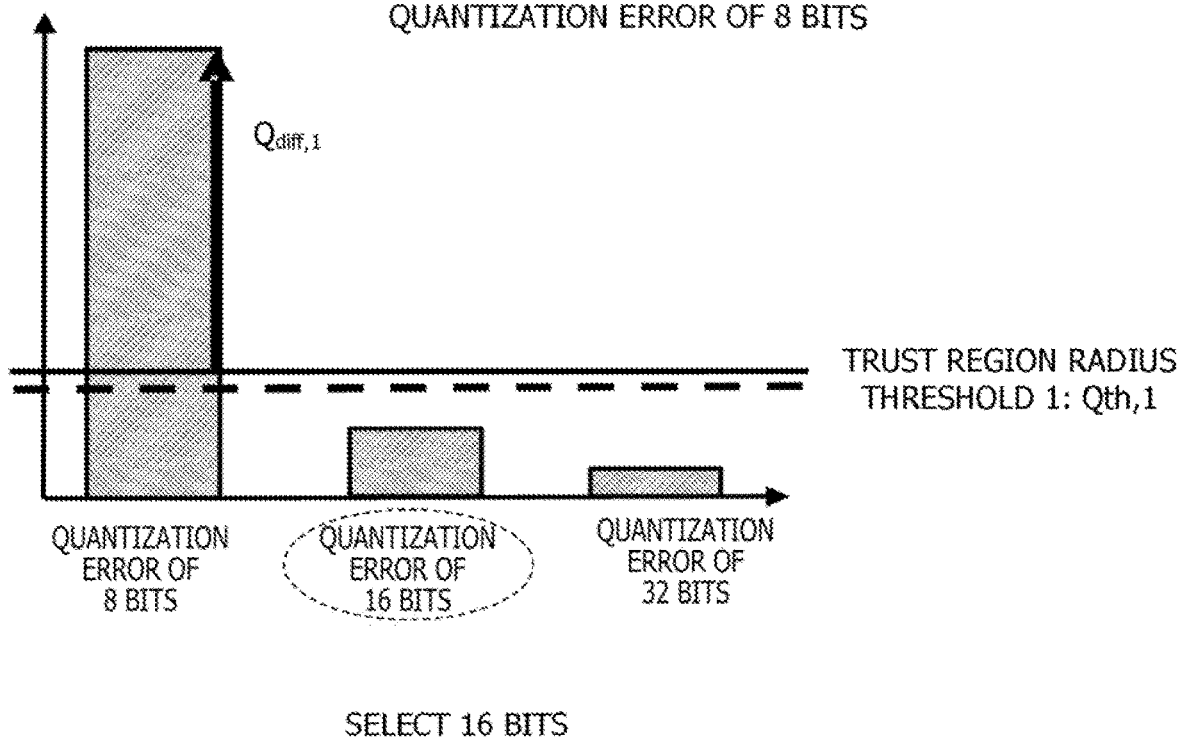
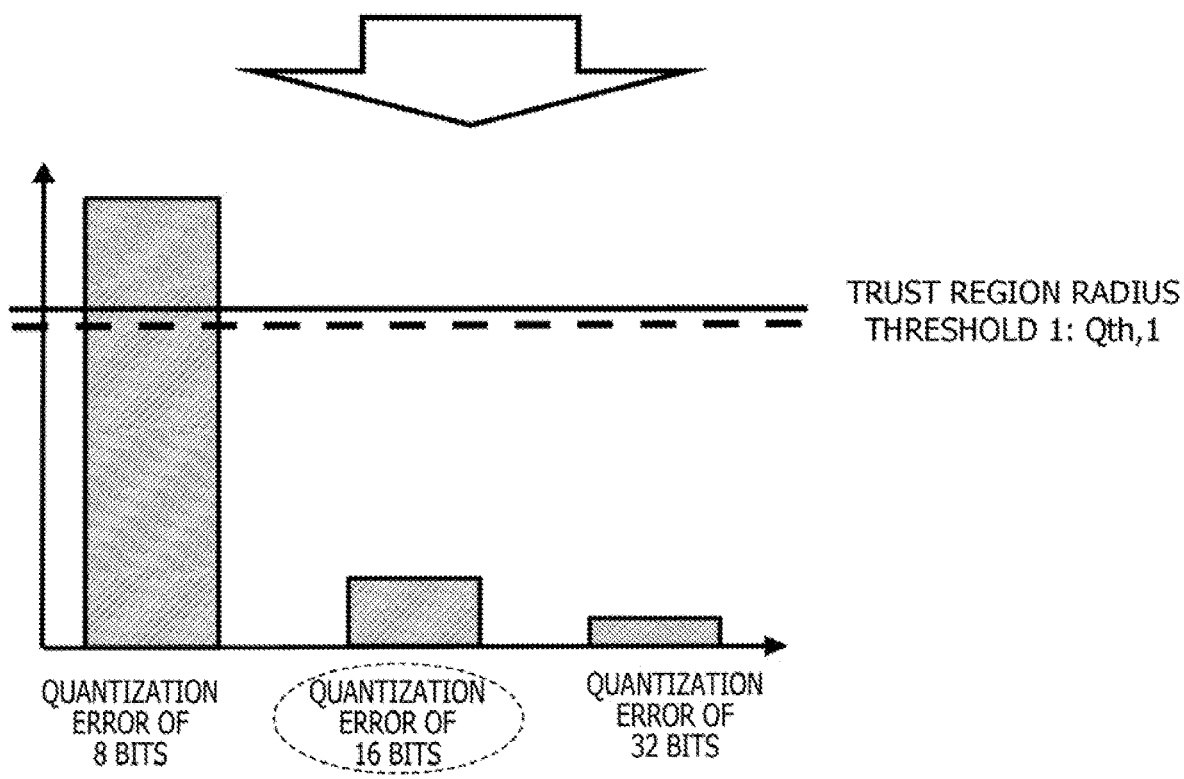

FIG. 8
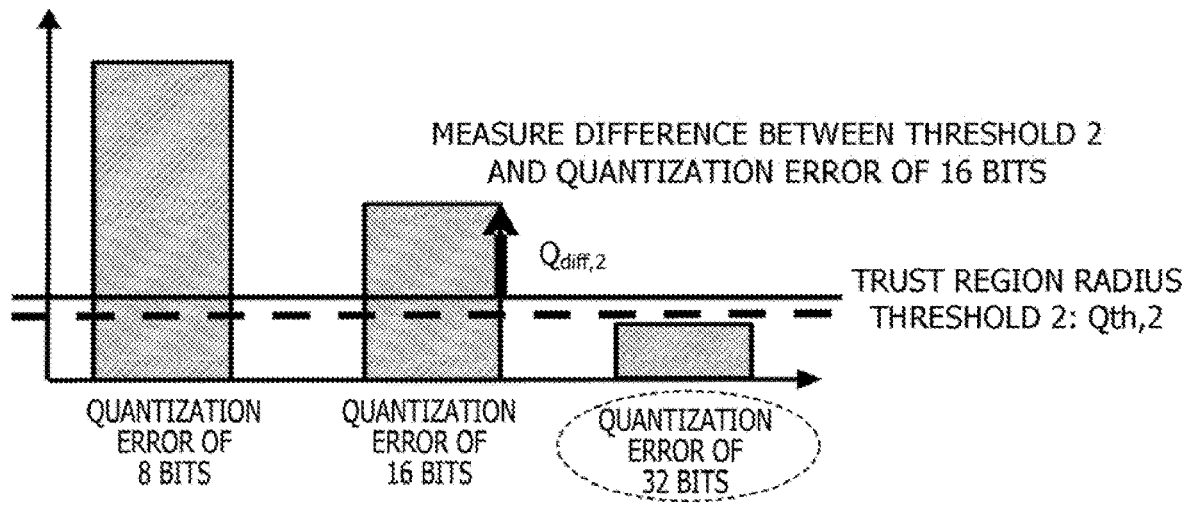
SELECT 32 BITS
UPPER LIMIT OF NEXT TRUST REGION RADIUS (= THRESHOLD)
MATCHES QUANTIZATION ERROR OF 16 BITS OF VECTOR W2
⇒ BIT WIDTH TO BE SELECTED NEXT TIME IS 16 BITS
⇒ BIT WIDTH DIFFERENT FROM PREVIOUS ONE IS SELECTED
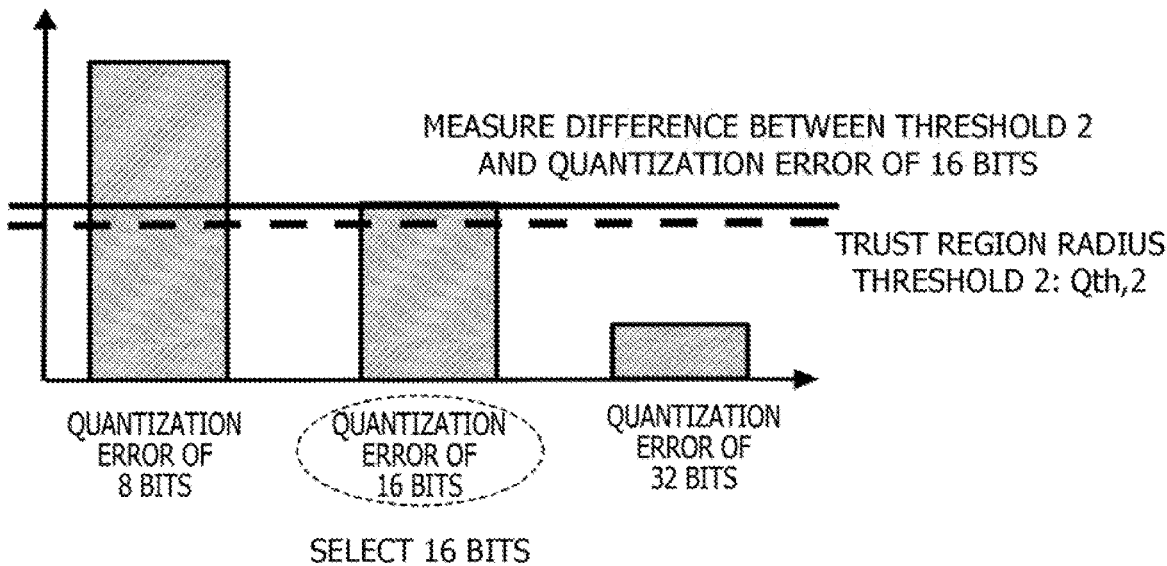
SELECT 16 BITS AUTOMATIC BIT WIDTH ADJUSTMENT IS PERFORMED FOR TASK THAT MAY BE TRAINED WITHOUT DEGRADATION IN RECOGNITION RATE EVEN WHEN 8 BITS ARE SET FOR ALL ····· : WHEN TRAINING IS PERFORMED WITH FLOAT32 IN ALL
——— : WHEN TRAINING IS PERFORMED WITH QINT8 IN ALL
---- : WHEN AUTOMATIC BIT WIDTH ADJUSTMENT ALGORITHM OF PRESENT DISCLOSURE IS APPLIED

STORAGE MEDIUM STORING QUANTIZATION PROGRAM, QUANTIZATION METHOD, AND QUANTIZATION APPARATUS

CROSS-REFERENCE TO RELATED APPLICATION

This application is based upon and claims the benefit of priority of the prior Japanese Patent Application No. 2020-200353, filed on Dec. 2, 2020, the entire contents of which are incorporated herein by reference.

FIELD

The embodiment discussed herein is related to a storage medium, a quantization method, and a quantization apparatus.

BACKGROUND

Quantization is known as a method for reducing the execution time of a neural network (NN) that is getting increasingly complicated.

In quantization, the calculation time and the communication time are reduced by converting a data type (for example, FP32) of weights used in a neural network into a data type (INT8) that involves a smaller data size.

An optimization algorithm for automatically setting, for each layer, a data type not causing a deterioration of a recognition rate is known as a quantization technique of the related art.

In such an optimization algorithm of the related art, a quantization error for a quantization-target vector is compared with a threshold determined by an algorithm based on a trust region method, and a bit width is temporarily calculated in accordance with a result of this comparison. In the trust region method, in order to avoid erroneous determination of the bit width caused by an approximation error, the threshold is scaled to be less than or equal to a trust region radius.

Training is performed for a plurality of iterations with a setting of the temporarily calculated bit width. Thereafter, an evaluation function is calculated.

The bit width and the trust region radius are updated depending on whether a constraint condition that a loss function calculated by using the temporarily calculated bit width is less than or equal to a loss function (ideal loss function) calculated under an ideal condition is satisfied.

For example, if the calculated loss function is less than or equal to the ideal loss function, the bit width is updated by using the value of the temporarily calculated bit width and the trust region radius is increased by multiplying the current trust region radius by a constant "a". The constant "a" in this case is a value greater than 1 ("a">1). On the other hand, if the calculated loss function is greater than the ideal loss function, the value of the bit width is maintained, the value of the temporarily calculated bit width is discarded, and the trust region radius is decreased by multiplying the current trust region radius by a constant "a". The constant "a" in this case is a value less than 1 ("a"<1).

In the quantization algorithm, these processing steps are repeatedly performed for a pre-specified number of iterations for all quantization-target layers.

International Publication Pamphlet No. 2020/049681 and Japanese Laid-open Patent Publication No. 2020-9048 are disclosed as related art.

SUMMARY

According to an aspect of the embodiments, a non-transitory computer-readable storage medium storing a quantization program that causes at least one computer to execute a process, the process includes calculating, for all layers of a neural network, differences each between a trust region radius threshold and a quantization error of a first bit width that is narrower by one step than a second bit width; calculating, based on the differences, each scaling coefficient for all the layers; updating a trust region radius by using a smallest value among the scaling coefficients; and quantizing a parameter of the neural network by a third bit width set based on the trust region.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating a relationship between a quantization error and a threshold in the information processing apparatus serving as the example of the embodiment;

FIG. 8 is a diagram illustrating a relationship between a quantization error and a threshold in the information processing apparatus serving as the example of the embodiment;

DESCRIPTION OF EMBODIMENTS

In such a quantization technique of the related art, it is possible to cause the bit width to certainly converge by increasing the number of iterations. However, increasing the number of iterations increases the execution time. On the other hand, when a period taken for optimization is limited, the bit width may not be sufficiently quantized within the period. As a result of insufficient quantization, the training time of a neural network also increases.

In one aspect, an object is to enable all layers to be optimized in a short time.

According to an embodiment, all layers may be optimized in a short time.

An embodiment of a quantization program, a quantization method, and a quantization apparatus will be described below with reference to the drawings. The embodiment presented below is merely an example and does not intend to exclude application of various modification examples and techniques that are not explicitly described in the embodiment. For example, the present embodiment may be carried out with various modifications without departing from the gist thereof. The individual drawings do not indicate that only constituent components illustrated therein are included. Thus, other functions and the like may be included.

(A) Configuration

Figure 1:
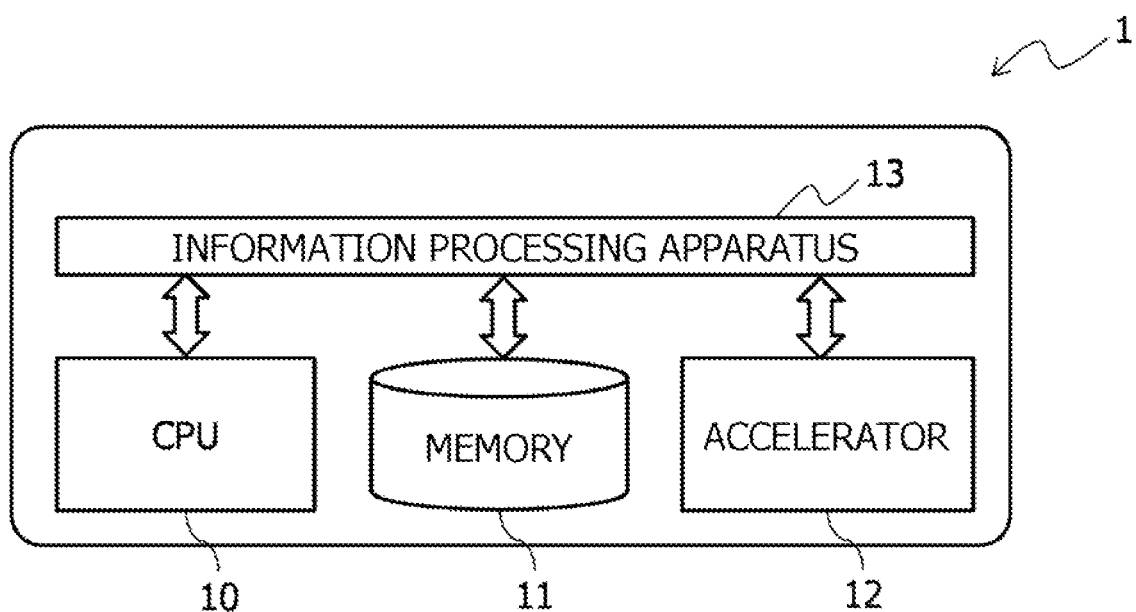
FIG. 1 is a diagram illustrating an example of a hardware configuration of an information processing apparatus serving as an example of an embodiment.

FIG. 1 is a diagram illustrating an example of a hardware configuration of an information processing apparatus 1 serving as an example of an embodiment.

The information processing apparatus 1 is a computer that implements a quantized neural network. As illustrated in FIG. 1, the information processing apparatus 1 includes a central processing unit (CPU) 10, a memory 11, and an accelerator 12. The CPU 10, the memory 11, and the accelerator 12 are coupled to each other through a communication bus 13 to be able to communicate with each other. The communication bus 13 enables data communication in the information processing apparatus 1.

The memory 11 is a storage memory including a read-only memory (ROM) and a random-access memory (RAM). In the ROM of the memory 11, a software program related to a quantization process and pieces of data for this program are written. The software program on the memory 11 is appropriately read and executed by the CPU 10. The RAM of the memory 11 is used as a primary storage memory or a working memory. The RAM of the memory 11 also stores parameters such as weights used in quantization, various thresholds, and so on.

The accelerator 12 performs a computation process, such as such as matrix computation, to be performed for calculation in the neural network.

The CPU 10 is a processing device (processor) that performs various kinds of control and computation. The CPU 10 controls the entire information processing apparatus 1 based an installed program. The CPU 10 executes a deep learning processing program (not illustrated) stored in the memory 11 or the like, and consequently implements functions of a deep learning processing unit 100 (FIG. 2), which will be described later.

The deep learning processing program may include a quantization program. The CPU 10 executes the quantization program (not illustrated) stored in the memory 11 or the like, and consequently implements functions of a quantization processing unit 101 (FIG. 2), which will be described later.

The CPU 10 of the information processing apparatus 1 executes the deep learning processing program (quantization program), and consequently functions as the deep learning processing unit 100 (the quantization processing unit 101).

The program (quantization program) for implementing the functions of the deep learning processing unit 100 (the quantization processing unit 101) is provided in a form of being recorded on a computer-readable recording medium such as, for example, a flexible disk, a compact disc (CD) such as a CD-ROM, a CD-recordable (CD-R), or a CD-rewritable (CD-RW), a Digital Versatile Disc (DVD) such as a DVD-ROM, a DVD-RAM, a DVD-R, a DVD+R, a DVD-RW, a DVD+RW, or high-definition (HD) DVD, a Blu-ray disc, a magnetic disk, an optical disc, or a magneto-optical disk. The computer (the information processing apparatus 1) reads the program from the recording medium, transfers the program to and stores the program in an internal storage device or an external storage device, and uses the program. For example, the program may be recorded in a storage device (recording medium) such as a magnetic disk, an optical disc, or a magneto-optical disk and may be provided from the storage device to the computer via a communication channel.

When the functions of the deep learning processing unit 100 (the quantization processing unit 101) are implemented, the program stored in the internal storage device (the RAM or the ROM of the memory 11 in the present embodiment) is executed by a microprocessor (the CPU 10 in the present embodiment) of the computer. At this time, the computer may read and execute the program recorded on the recording medium.

Figure 2:
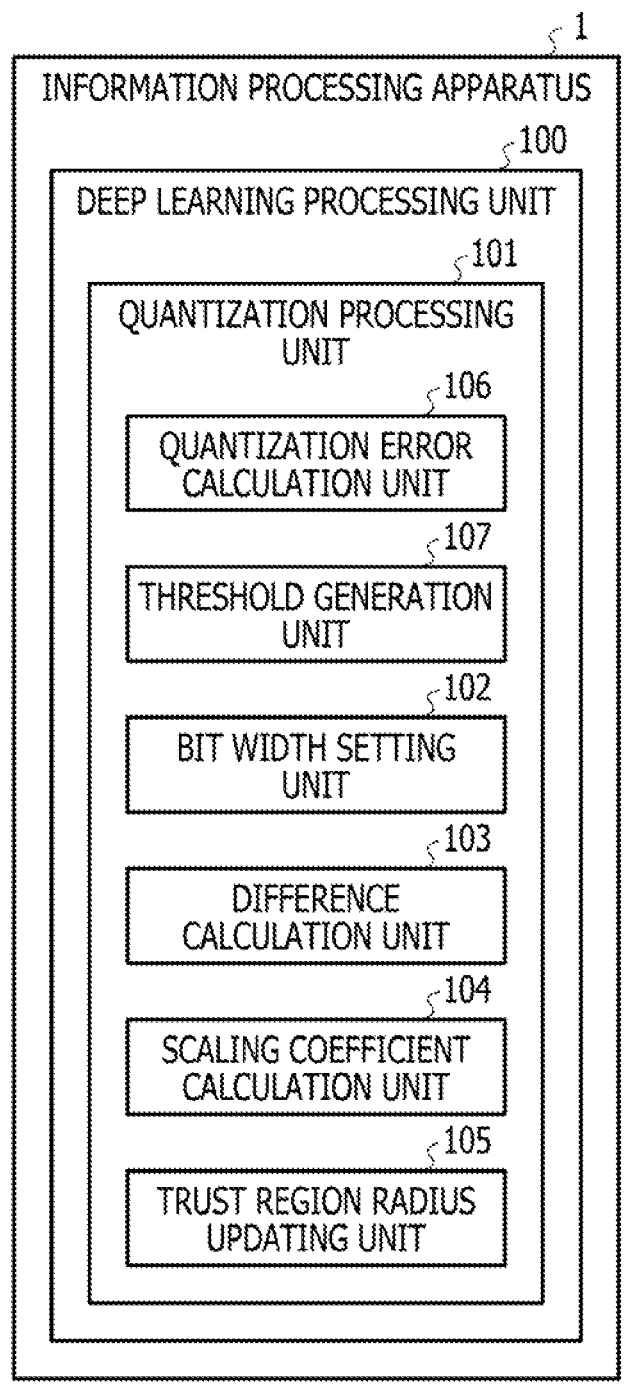
FIG. 2 is a diagram illustrating an example of a functional configuration of the information processing apparatus serving as the example of the embodiment.

FIG. 2 is a diagram illustrating an example of a functional configuration of the information processing apparatus 1 serving as the example of the embodiment.

As illustrated in FIG. 2, the information processing apparatus 1 has functions of the deep learning processing unit 100. The deep learning processing unit 100 performs deep learning in a neural network.

The neural network may be a hardware circuit or a software-based virtual network in which layers virtually built in a computer program by the CPU 10 or the like are coupled to each other.

Figure 3:
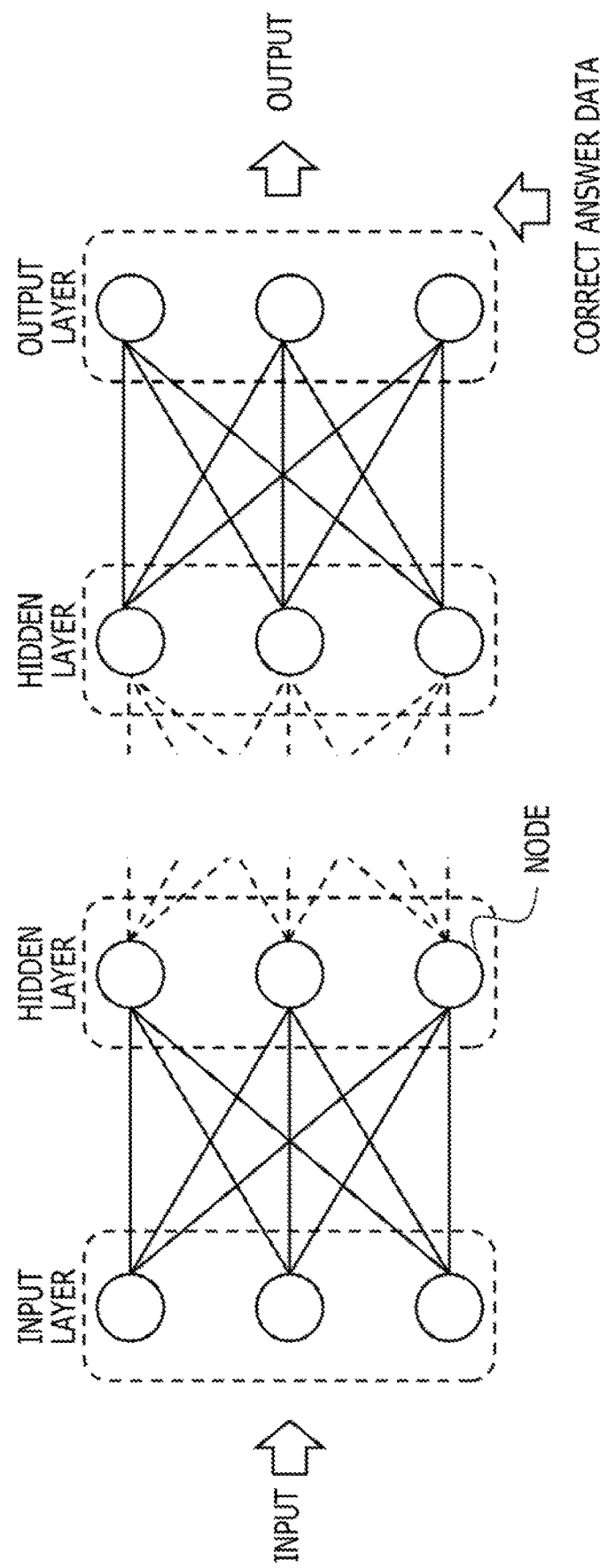
FIG. 3 is a diagram illustrating an overview of a neural network.

FIG. 3 illustrates an overview of the neural network. The neural network illustrated in FIG. 3 is a deep neural network including a plurality of hidden layers between an input layer and an output layer. The hidden layers are, for example, convolutional layers, pooling layers, fully connected layers, or the like. Circles illustrated in the individual layers represent nodes that perform respective certain calculations.

For example, the neural network receives input data such as an image or sound input to the input layer and sequentially performs the certain calculations in the hidden layers constituted by the convolutional layers, the pooling layers, or the like. In this manner, the neural network performs forward-direction processing (forward propagation processing) in which information obtained by computation is sequentially propagated from the input side to the output side. After the forward-direction processing is performed, backward-direction processing (back propagation processing) for determining parameters to be used in the forward-direction processing is performed in order to reduce a value of an error function obtained from output data output from the output layer and correct answer data. Update processing for updating variables such as weights is performed based on a result of the back propagation processing. For example, gradient descent is used as an algorithm for determining an update width of weights to be used in calculations in the back propagation processing.

The deep learning processing unit 100 includes the quantization processing unit 101.

The quantization processing unit 101 quantizes variables to be used in the neural network. In the information processing apparatus 1, the quantization processing unit 101 implements quantization by reducing the bit width of a weight vector in each layer. The information processing apparatus 1 uses the trust region method.

As illustrated in FIG. 2, the quantization processing unit 101 has functions of a quantization error calculation unit 106, a threshold generation unit 107, a bit width setting unit 102, a difference calculation unit 103, a scaling coefficient calculation unit 104, and a trust region radius updating unit 105.

The quantization error calculation unit 106 calculates a quantization error of a vector to be used in calculations in the neural network. Since the calculation of the quantization error may be implemented with various known methods, the description thereof will be omitted.

Figure 4:
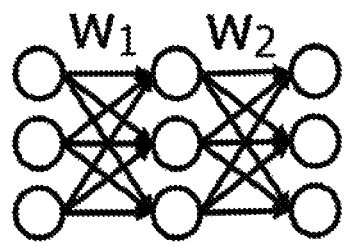
FIG. 4 is a diagram illustrating examples of quantization-target vectors in the information processing apparatus serving as the example of the embodiment.

FIG. 4 is a diagram illustrating examples of quantization-target vectors in the information processing apparatus 1 serving as the example of the embodiment.

An example will be presented in which a weight vector $W_1$ of a layer 1 and a weight vector $W_2$ of a layer 2 illustrated in FIG. 4 are subjected to quantization by the information processing apparatus 1.

The threshold generation unit 107 generates a trust region radius threshold, based on a set trust region radius and a bit width. Hereinafter, the trust region radius threshold may be simply referred to as a threshold in some cases. For example, the threshold generation unit 107 calculates a loss and a gradient by using the set bit width, and calculates the trust region radius threshold in accordance with Expression (1) for derivation below.

$$L(w + \Delta w) \sim L(w) + \frac{\partial L(w)}{\partial w} \Delta w \leq L_{ideal} + L_{margin} \quad (1)$$

$$\Downarrow$$

$$\Delta w \leq \frac{L_{ideal} + L_{margin}}{\frac{\partial L(w)}{\partial w}}$$

In Expression (1) above, $\Delta w$ denotes a quantization error. $L(w+\Delta w)$ denotes a loss function of a quantized base model (for example, INT16). $L(w)$ denotes a loss function of a base model (for example, INT32). $L_{ideal}$ denotes, for example, a loss function (ideal loss function) that is calculated with FP32 without quantization. $L_{margin}$ denotes a loss function margin amount of the loss function $L(w+\Delta w)$ of the quantized model from the ideal loss function $L_{ideal}$, and the margin amount is set by a designer.

The loss function $L(w+\Delta w)$ in the case of quantization is subjected Taylor expansion. A constraint is set such that, even if quantization is performed, the loss function is less than an amount obtained by adding the margin $L_{margin}$ to the ideal value $L_{ideal}$ (the loss function with FP32).

An upper limit of the quantization error that satisfies the constraint condition, the upper limit being equal to the threshold, is derived by rearranging Expression (1) above for the quantization error.

The threshold generation unit 107 sets (scales) the threshold such that an L2 norm ($\|W_{th}\|2$) of the threshold is less than or equal to the trust region radius. Hereinafter, the threshold may be denoted by a reference sign $Q_{th}$ in some cases.

The bit width setting unit 102 sets a bit width of a weight vector in each layer.

The bit width setting unit 102 calculates the loss function (ideal loss function) $L_{ideal}$ under the ideal condition.

The bit width setting unit 102 temporarily calculates the bit width. The bit width setting unit 102 temporarily calculates the smallest bit width with which the quantization error is less than or equal to the calculated threshold, among a plurality of candidates for the bit width. It is assumed that the information processing apparatus 1 uses three types (three steps) of bit widths [8, 16, 32] as the candidates for the bit width.

The bit width setting unit 102 checks whether the temporarily calculated bit width satisfies the constraint condition. The bit width setting unit 102 determines whether a loss function ($L_{tmp}$) based on the temporarily calculated bit width is less than or equal to the ideal loss function ($L_{ideal}$), as the constraint condition.

If the loss function ($L_{tmp}$) is less than or equal to the ideal loss function ($L_{ideal}$), for example, if the constraint condition is satisfied, the bit width setting unit 102 sets the temporarily calculated bit width as the bit width. If the constraint condition is satisfied, the bit width setting unit 102 increases the trust region radius by multiplying the current trust region radius by a constant (value greater than 1).

On the other hand, if the loss function ($L_{tmp}$) is greater than the ideal loss function ($L_{ideal}$), for example, if the constraint condition is not satisfied, the bit width setting unit 102 maintains the value of the bit width, discards the value of the temporarily calculated bit width, and decreases the trust region radius by multiplying the current trust region radius by a constant (value smaller than 1).

The difference calculation unit 103 measures, for all the quantization-target vectors (all the layers), differences ($Q_{diff}$) each between the trust region radius threshold ($Q_{th}$) and a quantization error of a bit width that is narrower by one step than the bit width temporarily calculated by the bit width setting unit 102.

Figure 5:
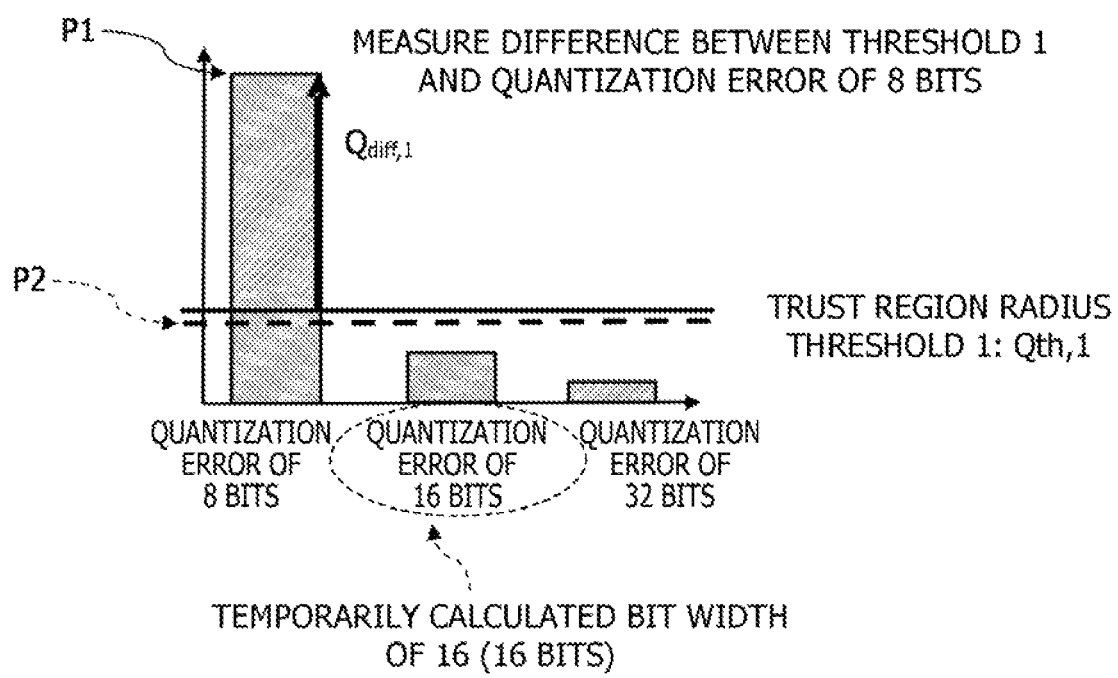
FIG. 5 is a diagram for describing a difference calculated by a difference calculation unit of the information processing apparatus serving as the example of the embodiment.
Figure 6:
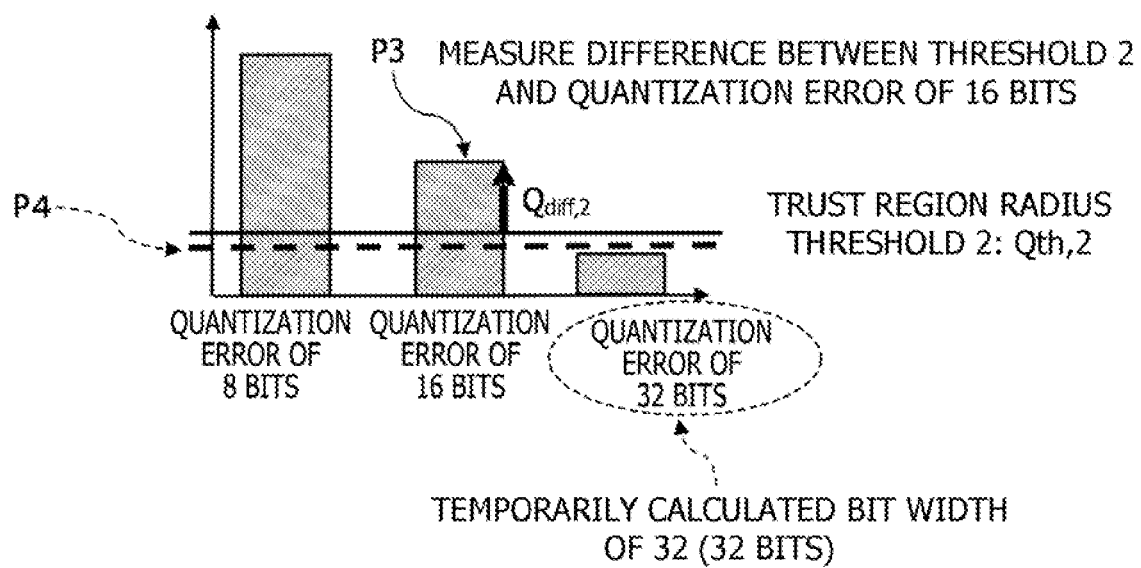
FIG. 6 is a diagram for describing a difference calculated by the difference calculation unit of the information processing apparatus serving as the example of the embodiment.

Each of FIGS. 5 and 6 is a diagram for describing the difference ($Q_{diff}$) calculated by the difference calculation unit 103 of the information processing apparatus 1 serving as the example of the embodiment. FIG. 5 is a diagram illustrating a quantization error for the weight vector $W_1$ of the layer 1. FIG. 6 is a diagram illustrating a quantization error for the weight vector $W_2$ of the layer 2.

In the example illustrated in FIG. 5, it is assumed that the temporarily calculated bit width is 16 bits. A threshold 1 for the layer 1 is denoted by a reference sign $Q_{th,1}$, and the difference for the layer 1 is denoted by a reference sign $Q_{diff,1}$. A threshold and a difference for each layer may be generalized such that the threshold for a layer k is denoted by a reference sign $Q_{th,k}$ and the difference for the layer k is denoted by a reference sign $Q_{diff,k}$.

The difference calculation unit 103 measures (calculates) the difference $Q_{diff,1}$ (see a reference sign P2) between the threshold 1 ($Q_{th,1}$) and the quantization error (see a reference sign P1) of a bit width of 8 (8 bits) that is narrower by one step than the temporarily calculated bit width of 16 (16 bits).

In the example illustrated in FIG. 6, it is assumed that the temporarily calculated bit width is 32 bits. A threshold 2 for the layer 2 is denoted by a reference sign $Q_{th,2}$, and a difference for the layer 2 is denoted by a reference sign $Q_{diff,2}$.

The difference calculation unit 103 measures (calculates) the difference $Q_{diff,2}$ (see a reference sign P4) between the threshold 2 ($Q_{th,2}$) and a quantization error (see a reference sign P3) of a bit width of 16 (16 bits) that is narrower by one step than the temporarily calculated bit width of 32 (32 bits).

The scaling coefficient calculation unit 104 calculates scaling coefficients ($Q_{scale}$) for all the quantization-target vectors (all the layers).

The scaling coefficient ($Q_{scale}$) is a value obtained for using, as a coefficient, the difference ($Q_{diff}$) calculated by the difference calculation unit 103 in multiplication performed by the trust region radius updating unit 105 described later.

The scaling coefficient calculation unit 104 calculates, for all the quantization-target vectors, the respective scaling coefficients $Q_{scale}$ by using the respective thresholds ($Q_{th}$) and the respective differences ($Q_{diff}$) each between the threshold and the quantization error of the bit width that is narrower by one step than the temporarily calculated bit width.

The scaling coefficient calculation unit 104 calculates the scaling coefficient ($Q_{scale}$) by using Expression (2) below.

$$Q_{scale,k} = 1 + Q_{diff,k}/Q_{th,k} \quad (2)$$

In Expression (2) above, the scaling coefficient is denoted in a generalized manner, and k denotes a layer number. Expression (2) indicates a scaling coefficient with which the upper limit of the next trust region radius, for example, the threshold matches the quantization error of the bit width that is narrower by one step than the bit width temporarily calculated this time.

From Expression (2) above, the scaling coefficient for the layer 1 is represented by Expression (3) below.

$$Q_{scale,1} = 1 + Q_{diff,1}/Q_{th,1} \quad (3)$$

From Expression (2) above, the scaling coefficient for the layer 2 is represented by Expression (4) below.

$$Q_{scale,2} = 1 + Q_{diff,2}/Q_{th,2} \quad (4)$$

No scaling coefficient is obtained in the case where there is no difference ($Q_{diff}$) between the threshold and the quantization error of the bit width that is narrower by one step than the temporarily calculated bit width.

The scaling coefficient calculation unit 104 selects, as a minimum scaling coefficient ($Q_{scale,min}$), the smallest value among all the scaling coefficients obtained for each layer.

If the next threshold becomes too large due to the scaling coefficient, there is a possibility that a bit width combination that makes it difficult to satisfy a constraint condition such as "bit width=8 bits in all the layers" is to be calculated. Accordingly, in the information processing apparatus 1, the minimum scaling coefficient is selected in order to gradually change the bit width.

The minimum scaling coefficient ($Q_{scale,min}$) is represented by Expression (5) below.

$$Q_{scale,min} = \min(Q_{scale,1}, Q_{scale,2}) \quad (5)$$

The trust region radius updating unit 105 updates the trust region radius.

The trust region radius updating unit 105 updates the trust region radius by using Expression (6) below.

Next trust region radius=Current trust region radius×
max(constant "a", $Q_{scale,min}$) (6)

The constant "a" is a certain constant (trust region radius updating constant) used for increasing or decreasing the trust region radius in a method of the related art. The trust region radius updating unit 105 updates the trust region radius by using a larger value of the trust region radius updating constant "a" (which may hereafter simply refer to as a constant "a" in some cases) and the scaling coefficient ($Q_{scale,min}$).

The scaling coefficient $Q_{scale,min}$ includes the above-described difference ($Q_{diff}$). Thus, if the scaling coefficient $Q_{scale,min}$ is selected, a different bit width is calculated next time. Therefore, in the case of "constant "a">$Q_{scale,min}$", a different bit width is calculated next time even if the constant "a" is selected.

Each of FIGS. 7 and 8 is a diagram illustrating a relationship between the quantization error and the threshold in the information processing apparatus 1 serving as the example of the embodiment. FIG. 7 is a diagram illustrating the quantization error for the weight vector $W_1$ of the layer 1. FIG. 8 is a diagram illustrating the quantization error for the weight vector $W_2$ of the layer 2.

In each of FIGS. 7 and 8, an upper side illustrates a state before the trust region radius is updated, and a lower side illustrates a state after the trust region radius is updated. The examples illustrated in FIGS. 7 and 8 present the case where $Q_{scale,2}$ is selected as $Q_{scale,min}$. For example, an example in which the trust region radius is updated by using $Q_{scale,2}$ is presented.

FIG. 7 presents an example in which the temporarily calculated bit width is 16 bits in the layer 1 but even after the trust region radius is updated by using $Q_{scale,2}$, the bit width to be selected next time is 16 bits and does not change. If the quantization error of the bit width that is narrower by one step is greater than the threshold $Q_{th,k}$ in this manner, the bit width is not updated.

On the other hand, in the layer 2 illustrated in FIG. 8, the temporarily calculated bit width is 32 bits but after the trust region radius is updated by using $Q_{scale,2}$, the upper limit of the next trust region radius (=the threshold) matches the quantization error of the vector. Thus, the bit width to be selected next is 16 bits, which indicates that a bit width different from the one selected the previous time is selected.

(B) Operation

Figure 9:
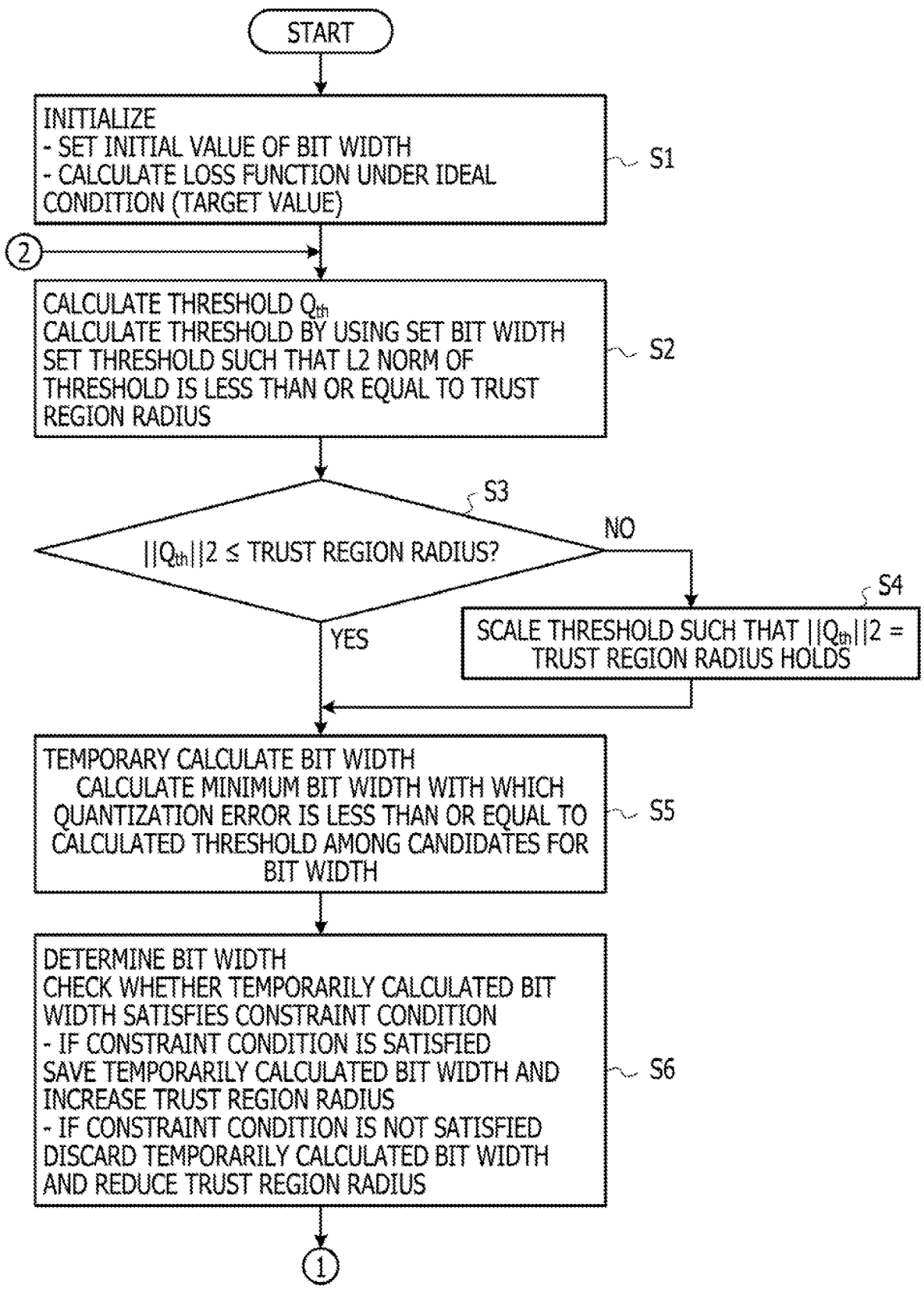
FIG. 9 is a flowchart for describing a quantization process performed in the information processing apparatus serving as the example of the embodiment.
Figure 10:
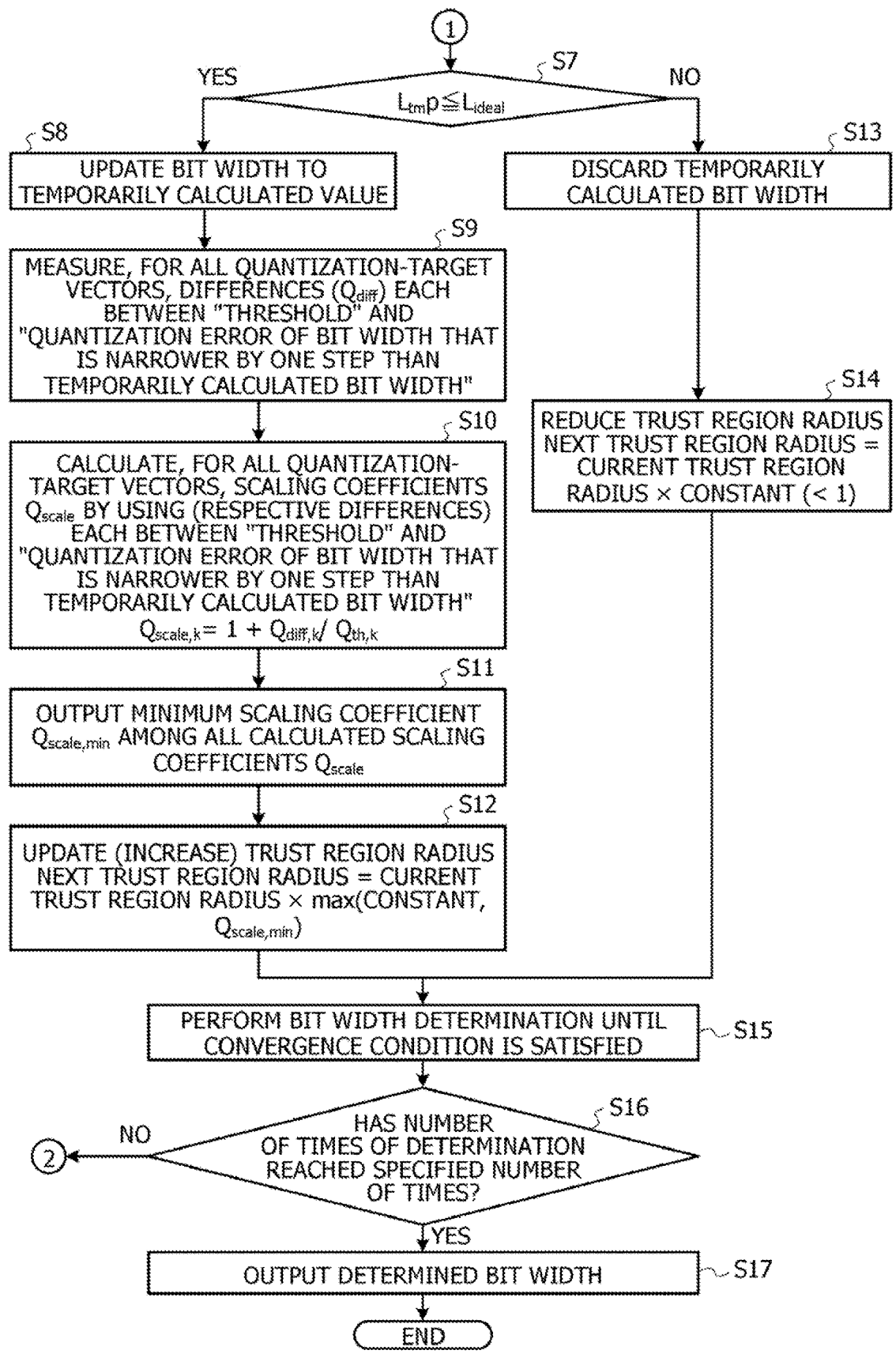
FIG. 10 is a flowchart for describing the quantization process performed in the information processing apparatus serving as the example of the embodiment.

A quantization process performed in the information processing apparatus 1 serving as the example of the embodiment configured as described above will be described in accordance with flowcharts (steps S1 to S17) of FIGS. 9 and 10. FIG. 9 illustrates step S1 to S6, and FIG. 10 illustrates step S7 to S17.

In step S1 in FIG. 9, the quantization processing unit 101 performs initialization processing. For example, the quantization processing unit 101 sets an initial value of the bit width and calculates the ideal loss function (target value).

In step S2 in FIG. 9, the threshold generation unit 107 calculates the threshold $Q_{th}$. The threshold generation unit 107 calculates the threshold $Q_{th}$ by using the set bit width. At this time, the threshold generation unit 107 sets the threshold such that the L2 norm of the threshold $Q_{th}$ is less than or equal to the trust region radius.

In step S3 in FIG. 9, the threshold generation unit 107 checks whether the L2 norm of the threshold $Q_{th}$ is less than or equal to the trust region radius. If the L2 norm of the threshold $Q_{th}$ is less than or equal to the trust region radius (see a "YES" route in step S3), the process proceeds to step S5 in FIG. 9.

On the other hand, if the L2 norm of the threshold $Q_{th}$ is greater than the trust region radius (see a "NO" route in step S3), the process proceeds to step S4. In step S4 in FIG. 9, the threshold generation unit 107 scales the threshold such that the L2 norm of the threshold $Q_{th}$ is equal to the trust region radius. The process then proceeds to step S5.

In step S5, the bit width setting unit 102 temporarily calculates the bit width. The bit width setting unit 102 temporarily calculates the smallest bit width with which the quantization error is less than or equal to the calculated threshold, among a plurality of candidates for the bit width.

In step S6 in FIG. 9, the bit width setting unit 102 checks whether the temporarily calculated bit width satisfies the constraint condition. The bit width setting unit 102 determines whether the loss function ($L_{tmp}$) based on the temporarily calculated bit width is less than or equal to the ideal loss function ($L_{ideal}$), as the constraint condition in step S7 in FIG. 10.

If the loss function ($L_{tmp}$) is less than or equal to the ideal loss function ($L_{ideal}$), for example, if the constraint condition is satisfied (see a "YES" route in step S7), the bit width setting unit 102 sets the temporarily calculated bit width as the bit width in step S8 in FIG. 10. Setting the bit width may be referred to as determining the bit width.

In step S9 in FIG. 10, the difference calculation unit 103 measures, for all the quantization-target vectors (all the layers), the differences ($Q_{diff}$) each between the threshold ($Q_{th}$) and the quantization error of the bit width that is narrower by one step than the bit width temporarily calculated by the bit width setting unit 102.

In step S10 in FIG. 10, the scaling coefficient calculation unit 104 calculates, for all the quantization-target vectors (all the layers), the scaling coefficients ($Q_{scale}$) by using Expression (2) described above.

In step S11 in FIG. 10, the scaling coefficient calculation unit 104 selects and outputs the minimum scaling coefficient ($Q_{scale,min}$) among all the calculated scaling coefficients.

In step S12 in FIG. 10, the trust region radius updating unit 105 updates (increases) the trust region radius by using Expression (6) described above. The process then proceeds to step S15.

On the other hand, as a result of the check in step S7, if the loss function ($L_{tmp}$) is greater than the ideal loss function ($L_{ideal}$), for example, if the constraint condition is not satisfied (see a "NO" route in step S7), the process proceeds to step S13 in FIG. 10.

In step S13, the bit width setting unit 102 maintains the value of the bit width and discards the value of the temporarily calculated bit width.

In step S14 in FIG. 10, the bit width setting unit 102 decreases the trust region radius by multiplying the current trust region radius by the constant "a" ("a" is a value less than 1).

The quantization processing unit 101 repeatedly performs the processing of step S2 to S14 (bit width determination processing) until a convergence condition is satisfied in step S15 in FIG. 10. For example, the quantization processing unit 101 counts the number of times the processing of step S2 to S14 is performed (the number of times of determination), and checks whether the number of times of determination has reached a pre-specified number of times in step S16 in FIG. 10.

As a result of the check, if the number of times of determination has not reached the specified number of times (see a "NO" route in step S16), the process returns to step S2 in FIG. 9. On the other hand, if the number of times of determination has reached the specified number of times (see a "YES" route in step S16), the quantization processing unit 101 outputs the determined bit width in step S17 in FIG. 10. The quantization processing unit 101 may store, for each layer, the determined bit width in a certain storage area of the memory 11, a storage device (not illustrated), or the like. The quantization processing unit 101 performs quantization by using the bit width determined for each layer. The process then ends.

(C) Effects

As described above, according to the information processing apparatus 1 serving as the example of the embodiment, the difference calculation unit 103 measures, for all the quantization-target vectors (all the layers), the differences ($Q_{diff}$) each between the threshold ($Q_{th}$) and the quantization error of the bit width that is narrower by one step than the bit width temporarily calculated by the bit width setting unit 102.

The scaling coefficient calculation unit 104 calculates, for all the quantization-target vectors (all the layers), the scaling coefficients ($Q_{scale}$), and selects, as the minimum scaling coefficient ($Q_{scale,min}$), the smallest value among all the scaling coefficients obtained for the respective layers.

The trust region radius updating unit 105 updates the trust region radius by using a larger value of the constant "a" and the scaling coefficient ($Q_{scale,min}$). Consequently, in the bit width determination processing, as a combination of the bit widths of the respective layers after the trust region radius is updated, the bit widths that are different from the previous ones and with which the upper limit of the updated trust region radius (=threshold) matches the quantization error of the vectors are selected.

Thus, whether the temporarily calculated bit width satisfies the constraint condition is determined for a different bit width combination every time. For example, determination as to whether the constraint condition is satisfied is not performed in a duplicate manner for the same bit width combination.

Therefore, the determination is not performed for the duplicate bit width combination, and the bit width determination may be efficiently performed. For example, all the layers may be optimized in a short time.

The bit width may be sufficiently quantized within a limited optimization period. The number of times an algorithm is applied until the bit width is optimized may be reduced, and the calculation time and the calculation cost may be reduced. The degree of quantization is increased as compared with the technique of the related art. As a result, the training time of the neural network may be reduced.

A reason why a large number of iterations are performed for convergence of the bit width in the quantization technique of the related art is that there is a case where it is determined again whether the constraint condition is satisfied with the bit width combination for which the determination has been performed once. As a result of the constraint condition being determined again with the bit width combination for which the determination has been performed once, duplicate work is performed. This increases the time for the quantization process.

In contrast, in the information processing apparatus 1, the determination for the duplicate bit width combination is not performed, and the bit width determination may be efficiently performed.

Figure 11:
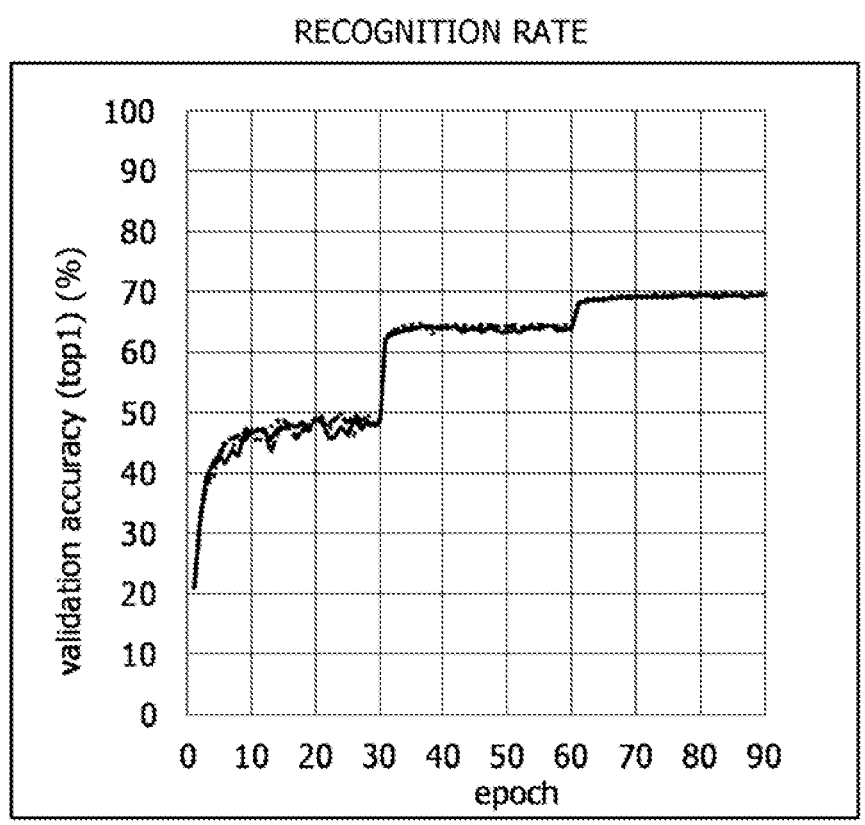
FIG. 11 is a diagram illustrating an example of a result of quantization performed by the information processing apparatus serving as the example of the embodiment.
Figure 12:
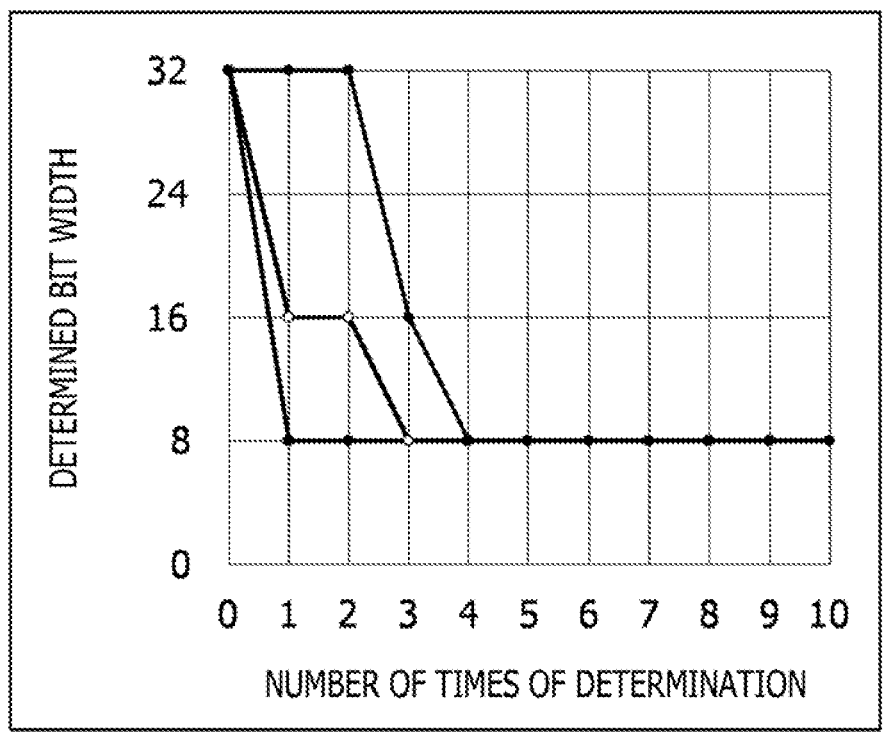
FIG. 12 is a diagram illustrating an example of a result of the quantization performed by the information processing apparatus serving as the example of the embodiment.

Each of FIGS. 11 and 12 is a diagram illustrating an example of a result of quantization performed by the information processing apparatus 1 serving as the example of the embodiment.

In FIG. 11, the horizontal axis represents the number of epochs, and the vertical axis represents a validation accuracy. As illustrated in FIG. 11, it is indicated that even when the bit widths are set to 8 bits for all the layers by quantization performed by the information processing apparatus 1 (in the case where all the layers are trained by using QINT8), bit width adjustment (quantization) that enables training without degradation in the recognition rate (validation accuracy) is performed.

In FIG. 12, the horizontal axis represents the number of times of determination, and the vertical axis represents the determined bit width. As illustrated in FIG. 12, the bit widths are set to (determined to be) 8 bits for all the layers within the optimization period (the number of times of application=10 times) by quantization performed by the information processing apparatus 1.

(D) Others

The disclosed technique is not limited to the embodiment described above and may be carried out with various modifications without departing from the gist of the present embodiment. The individual configurations and individual processes described in the embodiment may be selectively adopted or omitted as appropriate or may be combined as appropriate.

For example, in the embodiment described above, the example in which quantization is implemented by reducing the bit width of the weight vector in each layer has been described. However, the configuration is not limited to this. For example, the present disclosure may be applied to quantization of activation, weighted gradients, activated gradients, or the like, and may be carried out with various modifications.

The disclosure described above enables a person skilled in the art to implement or manufacture the embodiment.

(E) Appendices

Regarding the embodiment above, the following appendices will be further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a quantization program that causes at least one computer to execute a process, the process comprising:
    calculating, for all layers of a neural network, differences each between a trust region radius threshold and a quantization error of a first bit width that is one of candidates of a plurality of steps of bit widths and narrower by one step than a second bit width included in the one of candidates;
    calculating, by using ratio of the differences to the trust region radius threshold, each scaling coefficient for all the layers;
    updating a trust region radius by multiplying the trust region radius by a larger value of a smallest value among the scaling coefficients and a constant used for updating the trust region radius; and
    quantizing a parameter of the neural network by a third bit width set based on the updated trust region radius.

2. A quantization method for a computer to execute a process comprising:
    calculating, by a quantization program for all layers of a neural network, differences each between a trust region radius threshold and a quantization error of a first bit width that is one of candidates of a plurality of steps of bit widths and narrower by one step than a second bit width included the one of candidates;
    calculating, by the quantization program by using ratio of the differences to the trust region radius threshold, each scaling coefficient for all the layers;
    updating, by the quantization program, a trust region radius by multiplying the trust region radius by a larger value of a smallest value among the scaling coefficients and a constant used for updating the trust region radius; and
    quantizing, by the quantization program, a parameter of the neural network by a third bit width set based on the updated trust region radius.

3. A quantization apparatus comprising:
    one or more memories storing a quantization program; and
    one or more processors coupled to the one or more memories and the one or more processors configured executed the quantization program to:
        calculate, for all layers of a neural network, differences each between a trust region radius threshold and a quantization error of a first bit width that is one of candidates of a plurality of steps of bit widths and narrower by one step than a second bit width included in the one of candidates;
        calculate, by using ratio of the differences to the trust region radius threshold, each scaling coefficient for all the layers;
        update a trust region radius by multiplying the trust region radius by a larger value of a smallest value among the scaling coefficients and a constant used for updating the trust region radius; and
        quantize a parameter of the neural network by a third bit width set based on the updated trust region radius.

* * * * *